No. 712,920. Patented Nov. 4, 1902.
C. B. FISHER & C. L. TAYLOR.
HITCHING APPLIANCE FOR VEHICLES.
(Application filed May 23, 1901. Renewed Apr. 14, 1902.)
(No Model.) 2 Sheets—Sheet 1.
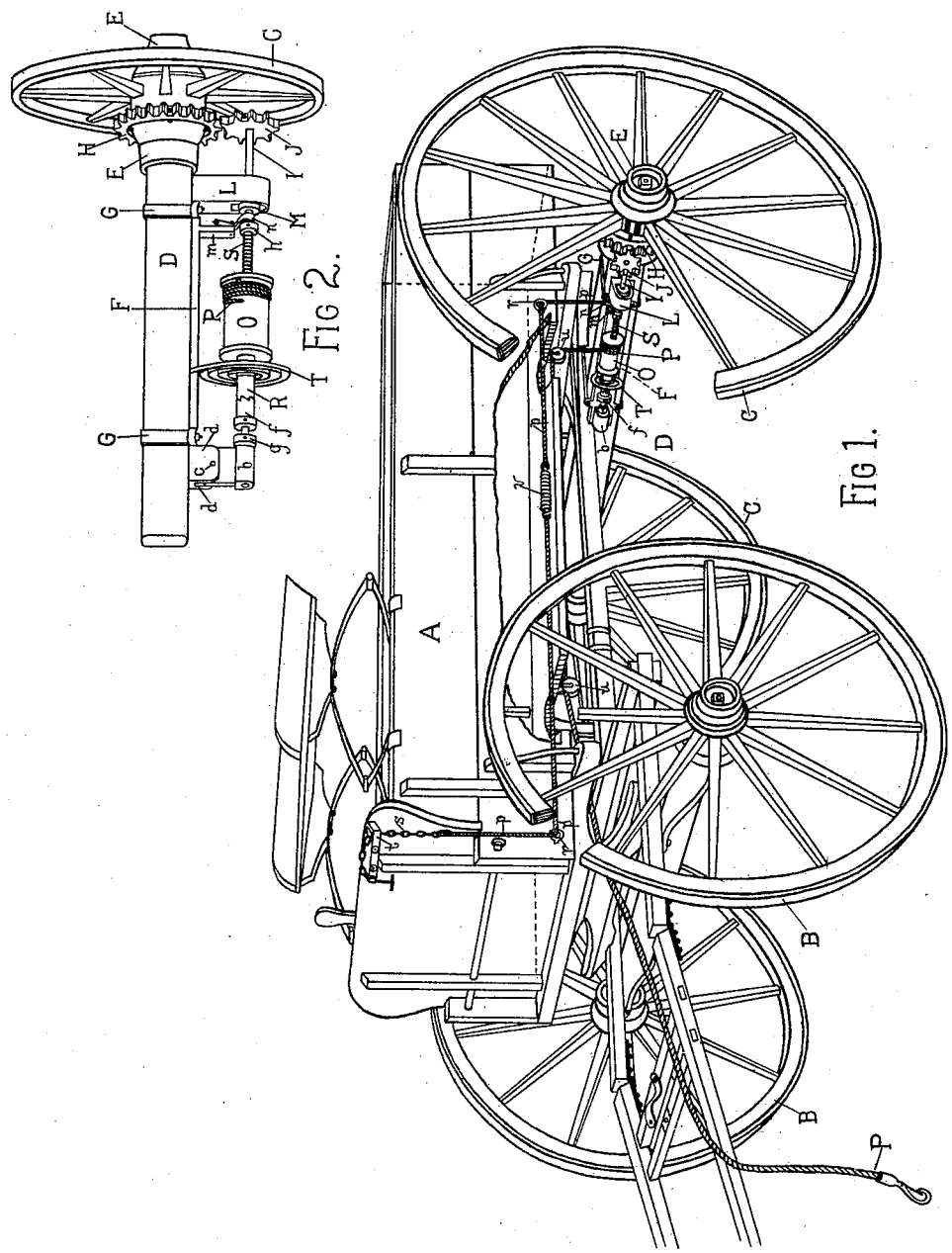
WITNESSES:
R. H. Henderson
P. F. Swinehart
INVENTORS
C. B. Fisher
and C. L. Taylor
BY H. C. Gardiner,
ATTORNEY.

No. 712,920. Patented Nov. 4, 1902.
C. B. FISHER & C. L. TAYLOR.
HITCHING APPLIANCE FOR VEHICLES.
(Application filed May 23, 1901. Renewed Apr. 14, 1902.)
(No Model.) 2 Sheets—Sheet 2.
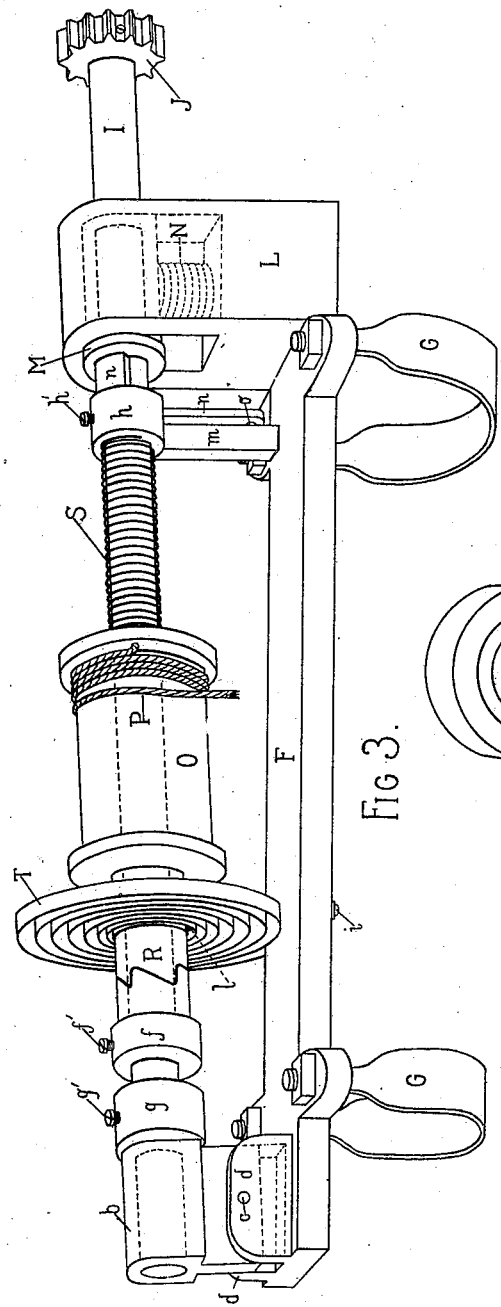
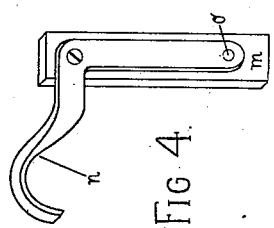
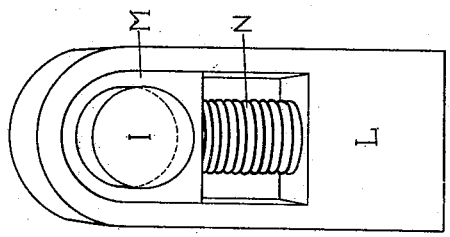
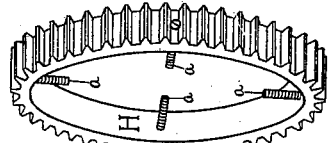
WITNESSES:
R. A. Henderson
P. F. Quicinhart
INVENTORS
C. B. Fisher
and C. L. Taylor,
BY
H. C. Gardiner,
ATTORNEY.

UNITED STATES PATENT OFFICE.

CHARLES B. FISHER AND CLINTON L. TAYLOR, OF SIOUX CITY, IOWA, ASSIGNORS TO MARGARET SEACOY, OF SIOUX CITY, IOWA.

HITCHING APPLIANCE FOR VEHICLES.

SPECIFICATION forming part of Letters Patent No. 712,920, dated November 4, 1902.

Application filed May 23, 1901. Renewed April 14, 1902. Serial No. 102,934. (No model.)

*To all whom it may concern:*

Be it known that we, CHARLES B. FISHER and CLINTON L. TAYLOR, citizens of the United States, residing at Sioux City, in the county of Woodbury and State of Iowa, (whose post-office addresses are Sioux City, Iowa,) have invented a new and useful Improvement in Hitching Appliances for Vehicles; and we do declare the following to be a full, clear, and exact description of the same, reference being had to the accompanying drawings, forming a part thereof.

Our invention relates to hitching appliances for wagons and carriages; and its object is to provide means whereby horses attached to vehicles may be quickly and firmly secured when left standing without the use of posts, hitching-straps, or weights. This object we attain by an attachment to the rear axle of the vehicle operated by one of the rear wheels in such manner that when the horse moves forward he is immediately checked and when he stops the check is at once released.

In the accompanying drawings, forming a part of this specification, Figure 1 is a perspective view of wagon in side elevation, showing our invention complete. Fig. 2 is a perspective view showing plan of the essential part of invention attached to section of rear axle of wagon. Fig. 3 is an inverted plan view showing, partly in perspective, the same parts of invention shown in Fig. 2. Fig. 4 is an enlarged detail view of lever used to throw the appliance in operation. Fig. 5 is an enlarged detail view showing end of block and adjustable bearing in which the shaft operates. Fig. 6 is an enlarged detail view showing in perspective the cogged wheel attached to hub of vehicle and means of securing same.

Reference is now had to the drawings, in which like parts are designated by similar letters of reference.

A is the box or body of the wagon, B B the forward wheels, and C C the rear wheels.

D is the rear axle, and E the hub of left-hand rear wheel.

F is a flat strip of iron or other suitable material adapted to be clamped securely to the front side of the rear axle near the left wheel by means of two clamps G G.

A cogged rim-wheel H is slipped over the hub of the left rear wheel of the vehicle, on the inner side of the wheel, and securely fastened thereto by means of the screws $a$ $a$.

A shaft I, capable of revolving in suitable bearings, is pivotally secured at one end to the iron strip F, while at the other end is securely fastened a pinion or small cogged wheel J, adapted to enmesh with the cogged wheel H. Secured to the strip F at the end adjacent to the wheel is a block L, having a bearing M for the shaft capable of a limited lateral movement as the shaft is thrown in or out of engagement with the wheel of the vehicle. A spiral spring N, situated in the block to the rear of the loose bearing, forces the shaft forward and prevents the two cogged wheels from engaging each other when the appliance is not in operation. Near the central part of the shaft is a spool O, to which one end of a cord or cable P is attached and on which the cord is wound as the machine operates. The spool is loosely adjusted to the shaft and at one end has a half-clutch R with the usual teeth. The end of the shaft nearest the central part of the axle turns in the bearing $b$, a projection of which is pivotally secured, by means of the pin $c$, within the lugs $d$ $d$ on the strip F. Near the bearing $b$ are two round knobs $f$ and $g$, situated on the shaft I and capable of sliding thereon and of adjustment thereto in any position by means of the set-screws $f'$ and $g'$. The knob $f$ has a half-clutch corresponding to the ratchet R and adapted to operate the same. On the shaft I, near the bearing M, is another round knob $h$, capable of adjustment to the shaft by means of the set-screw $h'$. Between said knob and the spool, entwined about the shaft I, is a spiral spring S, adapted to force the clutches R and $f$ together. Encircling the half-clutch R, near the end of the spool, is a flat coil-spring T, secured at the outer end to the strip F by the screw $i$ and at the inner end to the spool by means of the rivet $l$.

Nearly opposite the knob $h$, projecting from the strip F, is a square bar or post $m$, at the outer end of which is pivotally secured near its center a crooked lever $n$, Fig. 4, one end of which grasps the shaft I from above in the manner of a bent finger between the knob $h$ and the block L. The other end of the lever has an eye o, adapted to receive a cord p, extending along the side of the box A, through the pulleys r r, and up the dashboard of the vehicle. To the front end of the cord is attached a chain s, which may be adjustably secured to a bar t, fastened to the front of the dashboard. The cable P extends under the wagon-box, passing over the pulleys u u and forward to the animal to whose bits it is attached. A spiral spring v, inserted in the cord p, permits the cord to yield to the vertical motion of the box of the vehicle and prevents unintentional pulling of the cord. When the appliance is not in operation, the cord p is loosely secured at the forward end, and the spiral spring N, pressing against the adjustable bearing of the shaft, keeps the two cogged wheels out of engagement with each other. When it is desired to secure the animal, the cord is pulled forward and secured, which causes the lever n to press the shaft backward and forces the cogged wheels into engagement. When the horse attempts to move forward, the shaft is turned backward and the half-clutch f turns the spool in the same direction, thus winding up the cable P and checking the animal. The spring T is wound up at the same time; but as soon as the horse stops it flies back to its normal position, forcing the clutches to slip past each other and unwinding the cable from the spool. The animal is thus released from the check as soon as his forward movement ceases, and if he makes other attempts the operation is repeated. If the horse backs, the clutches slip and the spool is not turned in either direction. The knobs f, g, and h may be adjusted to any part of the shaft to regulate the strength of the spring S.

Our invention may be constructed of material suitable for any kind of vehicle from the heaviest wagon to the lightest buggy and is applicable to either one or two horses.

Having described our invention, what we claim as new, and desire to secure by Letters Patent, is—

1. The combination with the axle of a vehicle, a wheel attached to the hub of said vehicle, a revolving shaft pivotally secured to said axle, a wheel at one end of said shaft adapted to have contact with the wheel on the hub of the vehicle, whereby said shaft is turned when the vehicle moves, and means for normally preventing said contact, of a spring secured to said shaft and connected with said axle and adapted to restore said shaft to its normal position, substantially as described.

2. The combination with the axle of a vehicle, a shaft revolving in suitable bearings attached to said axle, a cogged wheel secured to the hub of the vehicle and a cogged wheel on one end of said shaft, said cogged wheels adapted to enmesh with each other, means for normally keeping said wheels out of engagement with each other, of a coil-spring encircling said shaft, the outer end of said spring being secured to the axle and the inner end thereof being secured to the shaft, whereby said shaft is restored to its original position by the recoil of the spring, substantially as described.

3. A shaft pivotally secured at one end by suitable bearings to the axle of the vehicle, a bearing near the other end of said shaft in which said shaft revolves capable of a limited lateral movement, a cogged wheel at the end of said shaft near said movable bearings and a cogged wheel attached to the wheel of the vehicle adapted to enmesh therewith, a knob encircling said shaft near the pivotal end thereof having a half-clutch, said knob capable of being firmly secured to said shaft at any desired point, a spool loosely encircling said shaft and having a half-clutch adapted to engage the clutch on said knob; a cord secured to said spool at one end and adapted to connect at the other end with the animal, means for holding said clutches firmly together when in operation, a spring connecting the axle of the vehicle with the clutch on said spool and capable of restoring said spool to its original position when said shaft is turned in an opposite direction by the backing of the vehicle, means for normally keeping said cogged wheels out of engagement with each other and means for throwing them into engagement and securing the same, substantially as described.

4. A shaft pivotally secured by suitable bearings to the axle of a vehicle, a cogged wheel on one end of said shaft and a cogged wheel attached to the wheel of the vehicle adapted to enmesh therewith, a movable knob having a half-clutch encircling said shaft, said knob capable of being firmly secured to said shaft at any desired point, a movable spool encircling said shaft and having a half-clutch adapted to engage the clutch on said knob, a coil-spring encircling said spool, the outer end of said spring being connected with the axle and the inner end secured to said spool, whereby said spool is restored to its original position when said shaft is turned, and a cord secured to said spool and connected with the animal, substantially as described.

5. A shaft capable of revolving in suitable bearings secured to the axle of a vehicle, the bearing at one end of said shaft being pivotally secured to said axle, a wheel secured to the other end of said shaft and adapted to have contact with the hub of the wheel of the vehicle whereby said shaft is turned when the vehicle moves, means for normally preventing said contact, a half-clutch encircling said shaft and firmly secured thereto, a spool loosely encircling said shaft and having a half-clutch engaging with said first clutch, a cord secured at one end to said spool and at the other end to the animal, a spring for holding said clutches firmly together when in operation, means for regulating the strength of said spring, and means for restoring said spool to its original position when the shaft is turned in an opposite direction, a lever operating said shaft and adapted to force the wheel thereon into contact with the hub of the vehicle, a cord attached to said lever and extending to the forward part of the vehicle, and means for securing said cord, substantially as described.

6. A shaft pivotally secured at one end by suitable bearings to the axle of a vehicle, a bearing near the other end of said shaft capable of a limited lateral movement, said shaft adapted to revolve in said bearings, a wheel secured at the end of said shaft near said movable bearing adapted to connect with the hub of the vehicle and be revolved by said hub, a spring attached to said movable bearing and adapted to normally hold the wheel on said shaft out of contact with said hub, a crooked lever pivotally secured near the center to a projection from the axle of the vehicle near said movable bearing, one end of said lever grasping said shaft the other end having an eye for the attachment of a cord, a cord secured to said lever and extending to the front of the vehicle, a spiral spring in said cord adapted to yield to the vertical motion of the box of the vehicle, and a cord secured at one end to said shaft and at the other end to the animal, substantially as described.

In testimony whereof we have hereunto affixed our signatures in the presence of witnesses.

CHARLES B. FISHER.
CLINTON L. TAYLOR.

Witnesses for Charles B. Fisher:
  J. W. ELLYSON,
  GEO. F. FISHER.
Witnesses for Clinton L. Taylor:
  C. A. GETTY,
  F. W. LOHR.